United States Patent
Day

(10) Patent No.: US 7,587,760 B1
(45) Date of Patent: Sep. 8, 2009

(54) SYSTEM AND METHODS FOR PREVENTING DENIAL OF SERVICE ATTACKS

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 10/899,393

(22) Filed: Jul. 26, 2004

(51) Int. Cl.
G06F 11/00 (2006.01)
G06F 12/16 (2006.01)
G06F 15/18 (2006.01)
G08B 23/00 (2006.01)

(52) U.S. Cl. ............................ 726/22; 713/153; 726/21; 709/223; 709/224

(58) Field of Classification Search .................... 726/22
See application file for complete search history.

(56) References Cited

U.S. PATENT DOCUMENTS

| | | | |
|---|---|---|---|
| 6,202,081 B1 | 3/2001 | Naudus | 709/200 |
| 6,226,383 B1 | 5/2001 | Jablon | 380/30 |
| 6,353,891 B1 | 3/2002 | Borella et al. | 713/201 |
| 6,501,380 B1 | 12/2002 | Jakobsson | 340/571 |
| 6,519,703 B1 | 2/2003 | Joyce | 713/201 |
| 6,564,261 B1 | 5/2003 | Gudjonsson et al. | 709/227 |
| 6,636,969 B1 | 10/2003 | Jakobsson et al. | 713/180 |
| 6,721,721 B1 | 4/2004 | Bates et al. | 707/1 |
| 6,772,339 B1 | 8/2004 | Jakobsson et al. | 380/30 |
| 2004/0250123 A1* | 12/2004 | Robert et al. | 713/201 |
| 2005/0132219 A1* | 6/2005 | Robert | 713/201 |

OTHER PUBLICATIONS

Jakobsson et al., "Untraceable Email Cluster Bombs: On Agent-Based Distributed Denial of Service", May 2003, p. 1-11.*
M. Jakobsson, F. Menczer, "Untraceable Email Cluster Bombs: On Agent-Based Distributed Denial of Service", arXiv:cs.CY/0305042 vl, May 23, 2003., pp. 1-11.
Computing SA staff, "MCI guarantees against DOS attacks", ComputerWeekly.com, Mar. 5, 2004, hhtp://www.computerweekly.com/articles.asp, Visited Aug. 16, 2004, pp. 1-2.
Reardon, M., "Brainer networking gear to the rescue", CNET News.com, Feb. 27, 2004, hhtp://zdnet.com.com/2100-1103_2-5166589.html, Visited Jul. 13, 2004, pp. 1-3.

* cited by examiner

*Primary Examiner*—Matthew B Smithers
*Assistant Examiner*—Shewaye Gelagay

(57) ABSTRACT

Conventional countermeasures to Distributed Denial of Service (DDoS) attacks typically focus on practices and rules for organizing a robust, DDoS-resilient network which anticipates proactive cooperation of users. Such measures involve widespread implementation cooperation and may be difficult or problematic to enforce in a large organization. Configurations of the invention employ the attacker's technique preventatively against the attack to identify sources likely to be employed for DDoS attacks. Crawlers scan web sites for identifying pages likely to be exploited as launch pads by DDoS attackers. A scanner device dispatches robots for sending probe messages from the launch pads which emulate an actual attack. Each of the probe messages are sent to a known, predetermined destination for determining identifying characteristics of such a message. The identifying characteristics define a signature of messages emanating from the launch pad. Such probe messages are tagged with an identifying field or label, such as a predetermined address. The signatures are then employed for comparison with other incoming message traffic.

16 Claims, 7 Drawing Sheets

SYSTEM AND METHODS FOR PREVENTING DENIAL OF SERVICE ATTACKS

BACKGROUND

Harmful or malicious attacks on networked computer systems often take the form of a Distributed Denial of Service (DDoS) attack, in which the attacker attempts to overwhelm or disrupt a computer or network gateway by monopolizing a disproportionate share of system resources via bombardment or infiltration of messages or other resource demanding entities. Conventional DDoS attacks typically target a particular email or network address, and send an abnormally large number of emails or packets to force the target system to allocate resources to the point of exclusion of other processing, effectively disabling the target computer or network gateway along with other computers or entities which depend on it. For example, such an attack on an access gateway, such as a router or switch, into a Local Area Network (LAN) can effectively segregate the LAN from the rest of the network (e.g. Internet) by burdening, or flooding, the gateway with such DDoS messages.

A particular type of malicious attack is described by Jakobsson and Menczer as an "untraceable email cluster bomb." The general form of the attack is to use some of the very large number of email-sending forms available on the web to launch an anonymous email attack on a party (arXiv technical report cs.CY/0305042, May 2003; rsasecurity.com/rsalabs/staff/bios/mjakobsson). The reference discusses both a "best practices" approach to be adopted by web sites offering forms and particular defense approaches once an attack is recognized. A cooperative measure is proposed which identifies practices beneficial to a group of addresses to be protected. Therefore, the proposed techniques suggest a set of guidelines for the group, and is therefore dependent on "everyone doing the right thing", and on distinguishing attack from non-attack in order to effect remedial measures upon detection of an attack.

SUMMARY

Conventional DDoS attackers may attempt to perpetuate such an attack through third party web sites which have the effect of masking the true sender of the message, thus "anonymizing" the DDoS attacker. Certain web sites contain forms operable for sending emails to others, such as those allowing user driven entry of personal and/or reply information for "contact us" buttons, informational requests, etc. Such web sites often employ little scrutiny over the data input to these forms, and accordingly, these forms may be exploited as anonymous launch platforms for DDoS attacks. Automated web crawlers initiated on behalf of the attacker comb the web for web sites having such launch platforms. Software entities known as robots may be employed to automatically and repetitively employ the identified launch pads to populate the fields on the form and flood the target with emails, effecting the DDoS attack. Since such forms may, at most, include only the sending identity of the exploited site, the attacker remains anonymous and unidentifiable.

Typical DDoS attacks target an email address or server representing an entry point or gateway to an organization, network, VPN, or other computing enterprise. Conventional countermeasures, such as those proposed in the above reference, typically focus on practices and rules for organizing a robust, DDoS-resilient network which anticipates proactive cooperation of users, and/or distinguishing "attack" transmissions from "non-attack" transmissions. The former is prone to implementation issues and may be difficult or problematic to enforce in a large organization. The latter tends to permit erroneous results, either denying legitimate communications or allowing malignant ones, depending on the conservativeness of the criteria. For example, such countermeasures may include organizing or scrutinizing forms to avoid exploitation for anonymous sending. Further, some sites require an interactive operation or echoing of data, discouraging use by automated processes such as robots.

Configurations of the invention are based, in part, on two observations: (1) The set of sites offering email-sending forms changes rather slowly. If one has a good model of which email comes from risky sites today, that is still a pretty good model tomorrow; and (2) The technique used by an attacker to find attack platforms (e.g. so-called Googling for message-sending forms) is equally available to defenders. The invention thus applies the attacker's technique (searching for forms and sending emails to a single party) but applies it at a slow enough rate that it is not an attack. Instead, the emails received via this technique (sent to a special address used only for this purpose) are analyzed to determine ways in which they can be efficiently separated from other emails, similar to mechanisms employed for spam blocking.

For simplicity, exemplary configurations of the invention may describe operation in terms of two equivalence classes of email at the entry to the organization: those that are suspect according to the model, and those that are not. We do not attempt to suppress delivery of either class, we simply ensure that we do not let suspect emails starve delivery of benign emails. That is, regardless of how many suspect emails are awaiting delivery, progress continues on delivering benign emails.

Configurations of the invention substantially overcome the shortcomings of conventional DDoS attacks by effectively employing the attacker's technique against itself to selectively identify and isolate messages emanating from sources likely to be employed for such DDoS attacks. Crawlers scan web sites to identify pages likely to be exploited as launch pads by DDoS attackers. Responsively to the identified pages, or "launch pads," a scanning device dispatches robots for sending probe messages from the launch pads which emulate an actual attack. The probe messages are sent to a known, predetermined destination for determining identifying characteristics of such a message once it arrives. The identifying characteristics are then employed to derive a signature of messages emanating from that launch pad. Such probe messages are identifiable because they are sent to the known predetermined email address, and may further be tagged with an identifying field or label.

The scanners and crawlers, as disclosed herein, provide a mechanism of identifying and invoking websites, and is more fully described in "The Anatomy of a Large-Scale Hypertextual Web Search Engine," Sergey Brin and Lawrence Page, Computer Science Department, Stanford University, Stanford, Calif. 94305, Proceedings of the seventh international conference on World Wide Web, April 1998, Brisbane, Australia. In general, a particular configuration includes processes running on the scanner, contacting remote web sites over HTTP to either determine whether they have pages that could be used to launch an attack or filling in one of those pages to produce a probe message. Further, the scanners and crawler processes could actually be on a different machine, and further could be a mobile code process moving through the network to run on or near the emanating site. In particular, suspect or malicious network users may either exploit Google's crawlers by various queries to find suitable pages for launching an attack, or one may build a customized version of a system like Google™ so as to undertake the process of finding suitable pages.

The scanning device accumulates a repository of the signatures indicative of the launch pad sites from the probe messages sent by the robots. Further, the robots send the probe messages at a controlled rate so as not to cause an actual denial of service condition themselves, should they identify and send a large volume of probe messages simultaneously. The signatures may encompass a plurality of message characteristics, such as headers, postmarks, optional headers, open email relays, anonymizing relays, and others, depending on the network and the path from the launch pad to the collecting receiver at the scanning device.

The signature repository is then employed by a discriminator to compare the signatures to incoming message traffic. Such comparisons may employ a simple matching of header fields, or may employ a more complicated heuristic. The discriminator determines if the message traffic is likely suspect or non-suspect (benign), and categorizes the message accordingly. The discriminator queues suspect traffic in a designated partition which receives selective servicing, in contrast to the benign partition which continues to be serviced normally. The suspect partition, or queue, is serviced at a rate which would not disproportionately consume resources even if supplied at a rate consistent with a DDoS attack. Senders of such messages may receive bounce-back notifications, or excessive traffic may even be dropped if it reaches an overflow threshold. Therefore, the benign partition continues to receive normal service so as not to impede legitimate traffic, while the suspect partition receives conservative service, to avoid absolutely blocking otherwise legitimate emails from sites designated as potential launch pads.

In further detail, the method of detecting undesirable message traffic such as denial of service attacks includes identifying emanation points operable for transmitting a plurality of automated messages, and transmitting a probe message from an identified emanation point to a predetermined collector operable to intercept the transmitted message. The collector then gathers characteristics of the received probe message, in which the characteristics are operable to identify successive messages emanating from the emanation point.

In particular configurations, the emanation points are web sites, servers, or other computers accessible from the Internet and operable for transmitting anonymous emails via robots adapted to generate an undesirable volume of the anonymous emails. The device identifies web sites operable for such anonymous operation by dispatching crawlers operable to traverse a plurality of candidate web sites. The crawlers interrogate the traversed web sites to identify the emanation points for anonymous messages, and report the emanation points as identified anonymizing sites. Therefore, the crawlers identifying the potential launch sites by scanning for sites from which to launch email messages, and determine if the site is operable to transmit anonymous messages. if so, the crawlers designating the site as suspect message emanation point.

The scanning device dispatches robots operable to employ the identified emanation point as a site for sending a probe message. The robots tag the probe message with an identifier operable to identify the probe from legitimate unsolicited message traffic. In particular configurations, the robots tag the messages with at least one identifying characteristic, in which the identifying characteristics are operable to distinguish the message as an intended probe and indicative of the emanating site.

Responsively to the reported anonymous web sites, robots transmit emulated attack messages, or probes, addressed to a predetermined recipient collector, in which the collector is operable to identify the tagged probes and obtain the characteristics of the message for successive identification of messages. Further, the robots send the probes at a controlled rate which is sufficient to avoid undesirable operation from excessive probe messages, in which the probes emulate aspects of an actual DDoS attack.

In particular configurations, upon receipt of the probe messages, the collector builds a repository of gathered characteristics, in which the repository is operable for comparison with incoming messages. The discriminator correlates successively received message traffic with the gathered characteristics to determine messages emanating from an identified anonymous emanation point. The discriminator correlates the probe characteristics by evaluating a signature of the received messages with a corresponding signatures from the repository of gathered characteristics, and determining a likelihood that the received message emanates from a suspect emanation point. In the exemplary configuration, determining the signature includes characteristics selected from the group consisting of headers, postmarks, optional headers, open email relays, and anonymizing relays.

In the particular exemplary arrangements, the collector accumulates the received probes and builds a repository of suspect and benign message characteristics, in which the characteristics define a signature of messages emanating from benign and malicious sources. A discriminator receives successive messages, and the partitioner responsively partitions the messages into suspect and benign groupings by discriminating the received messages based on correlation of the received messages with the message characteristics in the repository. Accordingly, to avoid the effects of actual DDoS attacks, the partitioner partitions message traffic into suspect and benign queues, benign queues provided preferential treatment so as to not overwhelm the protected entity with potentially undesirable message traffic from the suspect queue.

In alternate configurations, the above described exemplary DDoS defense, is also readily applicable to telephony, SMS, or instant messaging, when a malicious user may obtain control of or exploit multiple anonymous (e.g. "anonymizing") sites from which to launch an attack. The methods described above are also applicable to these other mediums by the inversion of an attack mode into a slow method for detecting potential sources of attacks.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
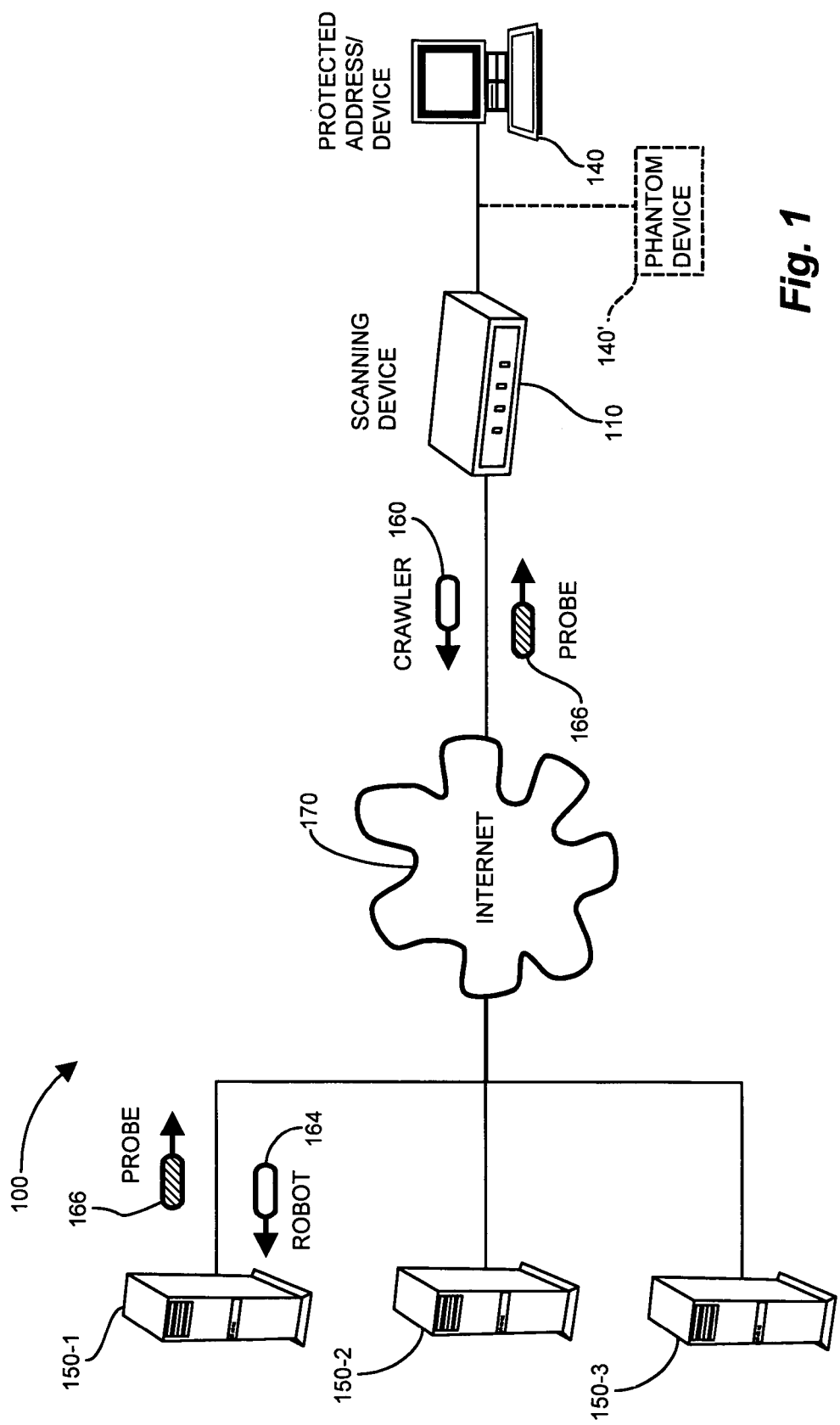
FIG. 1 is a context diagram of a network communications environment operable for use with the present invention.

Conventional DDoS attackers may attempt to perpetuate such an attack through third party web sites or other facilities which have the effect of masking the true sender of the message, thus "anonymizing" the DDoS attacker. Such web sites contain forms or other mechanisms operable for sending messages to others, and often employ little scrutiny over the data input to these forms. Accordingly, these forms may be exploited as anonymous launch platforms for DDoS attacks. A crawling process or set of automated web crawlers initiated on behalf of the attacker comb the web for web sites having such launch platforms. Similar software entities known as robots may be employed individually or as a set to automatically and repetitively employ the identified launch pads to populate the fields on the form and flood the target with emails, effecting the DDoS attack. Since such forms may, at most, include only the sending identity of the exploited site, the attacker remains anonymous and unidentifiable.

The configurations discussed herein are based, in part, on the observation that the set of anonymizing sites which lend themselves well as attack platforms tends to be rather static and that the technique used by an attacker to find attack platforms is equally available to defenders. The invention thus applies the attacker's technique but applies it at a slow enough rate that it is not an attack. Instead, the emails received via this technique are sent to a special address used to capture such probe messages to analyze and determine ways in which they can be efficiently separated from other emails.

Configurations of the invention, therefore, substantially overcome the shortcomings of conventional DDoS attacks by effectively employing the attacker's technique against itself to selectively identify and isolate messages emanating from sources likely to be employed for such DDoS attacks. Crawlers scan web sites for identifying pages likely to be exploited as launch pads by DDoS attackers. A server dispatches robots for sending probe messages from the launch pads which emulate an actual attack. The probe messages are sent to a known, predetermined destination for determining identifying characteristics of such a message once it arrives. The identifying characteristics may be employed to derive a signature of messages emanating from that launch pad. Such probe messages are identifiable because they are sent to a predetermined email address, and may further be tagged with an identifying field or label.

Accordingly, the exemplary configurations of the invention discussed herein employ the mechanism exploited by malicious users in a controlled manner to identify and isolate subsequent malicious transmission, or attacks, delivered in the same or similar manner. In a manner which may be loosely analogized to human virus immunity, a small, controlled "dose" of the malignant element is introduced to develop an immunity to a larger exposure. In effect, the claimed configurations of the invention use the malicious attack mechanism against itself.

FIG. 1 is a context diagram of a network communications environment 100 operable for use with the present invention. Referring to FIG. 1, the environment 100 includes a scanning device 110, such as a router or server configured according to the principles of the invention, connected to a protected address or device 140 such as a network node or email address therein. Typically the protected address represents a gateway to a larger entity, such as a local area network (LAN), private internet or intranet. The scanner device 110 is also connected to a public access network such as the Internet 170. The Internet 170 includes connections to a plurality of other network entities 150-1 . . . 150-3 (150, generally), some of which may be malicious or harmful sites adapted to propagate DDoS attacks or other undesirable transmissions, discussed further below.

In operation, the scanning device 110, which may be a dedicated computer or installed software or hardware entity which is part of a larger router, gateway, or server, is disposed between the protected device 140 and the untrusted connection to the Internet 170 or other potential source of DDoS attacks. The scanning device 110 employs crawlers 160 and robots 164, which are typically processes or threads running on the scanning device 110 to effectively traverse the network by sending request messages and receiving response messages. Crawlers 160 identify entities 150 which are potential launch sites. As indicated above, launch sites are those network entities 150 which offer the ability to sent anonymous emails, such as reply or data entry forms which may be automatically populated by a robot 164. The scanning device 110 deploys robots 164 to send probe messages 166 back to a predetermined "phantom" device address 140' handled by the scanning device 110, where the probe messages 166 are identifiable as such and collected so that characteristics of the probe messages 166 from each launch site 150 are determinable. The phantom device 140' emulates a potential DDoS victim 140 for purposes of receiving the probe messages 166, as described further below. The phantom device 140' need not be a dedicated standalone device, but rather may take the form of a dedicated email address at the scanner 110 for receiving the decoy messages 166.

In the exemplary configuration, the "phantom device" 140' is disposed next to the protected device 140, because it is beneficial that the probe message 166 be sent to an apparent "device" that is as close as possible to the protected device 140 in the address space and/or message handling, so that the signatures learned from the probes 166 to the phantom device 140' are highly likely to also be relevant for the protected device 140. In this phantom-device 140' approach, the probe 166 is being sent to a non-existent device 140' that is "next to" the protected device 140. Alternately, tagging of the probe's contents may be performed when the probe messages 166 need to be sent to the actual address of the protected device 140, discussed further below.

The probe messages 166 may be intercepted by the scanning device 110 according to any suitable method. In particular arrangements, a WCCP (Web Cache Communication Protocol) or NBAR (Network Based Application Recognition) running on a router diverting relevant traffic to the scanning device 110 may be employed. Alternatively, the scanning device 110 may be inline with the protected address 140 such that all traffic is examined by the device 110 for pertinent criteria.

Figure 2:
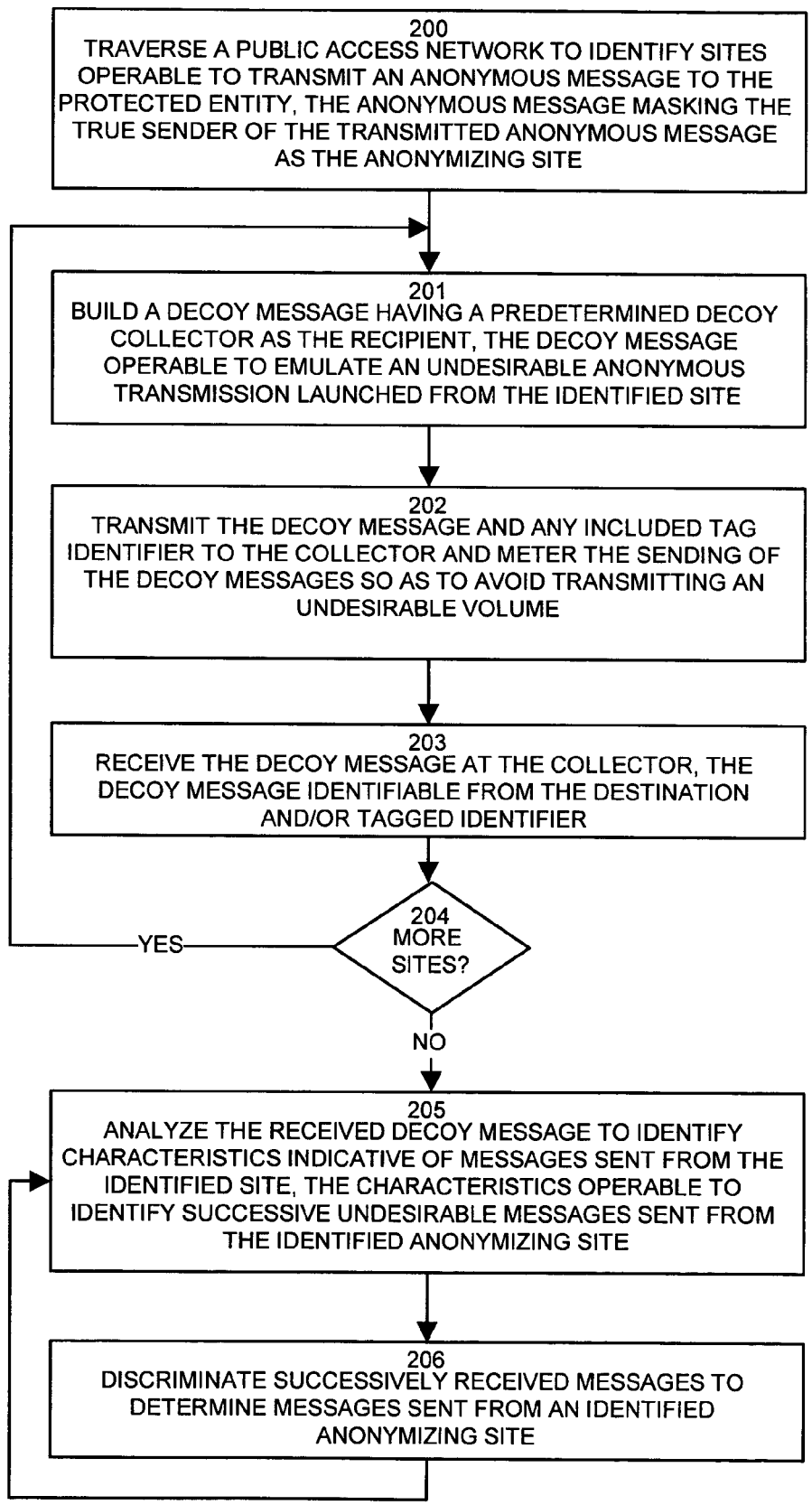
FIG. 2 is a flowchart of employing the server device for scanning DDoS message traffic in the network of FIG. 1.

FIG. 2 is a flowchart for employing the scanning device 110 for scanning DDoS message traffic in the network of FIG. 1. Referring to FIGS. 1 and 2, the method for detecting and preventing denial of service attacks includes traversing a public access network such as the Internet 170 to identify sites 150 operable to transmit an anonymous message to the protected entity 140, in which the anonymous message masks the true sender of the transmitted anonymous message, as depicted at step 200. One such manner of traversing the network is by employing so-called web crawlers 160, or software entities for rapidly traversing, or "hopping" among web sites 150 in a systematic fashion and attempting particular operations on each site. Alternatively, the crawler or spider of a search engine such as Google™ may be employed in an automated manner to enumerate and traverse the web sites.

Upon finding a potential anonymizing site 150, the scanning device 110 builds or employs a probe message 166 having a predetermined probe collector (118 FIG. 3, below) as the recipient, in which the probe message 166 is operable to emulate an undesirable anonymous transmission (e.g. DDoS attack) launched from the identified site 150, as shown at step 201. Typically, the collector 118 is a designated email account at or near the scanning device 110, such as via one of the interception mechanisms described above. In the exemplary configuration, the probe message 166 operates as a probe for identifying the characteristics possessed by a message sent from the anonymizing site 150, therefore emulating the message which a true DDoS attack would transmit.

The probe message 166 may be tagged with an identifier to designate the probe message 166 upon receipt by the collector 118, and the identified site 150-1 transmits the probe message 166 to the collector 118, as depicted at step 202. However, the destination (i.e. predetermined email) of the probe message may not require a tag for clarification. The scanning device 110 meters the sending of the probe messages 166 so as to avoid transmitting an undesirable volume of probe messages 166, thereby preventing the probe messages 166 from causing the effects of an actual DDoS attack from their diagnostic activity.

The scanning device 110 receives the probe message at the collector 118. In the exemplary arrangement, the probe message 166 is identifiable from the tagged identifier and/or by virtue of being sent to a dedicated email account designated by the collector 118, thus being identifiable from the destination address, as disclosed at step 203. Alternate configurations may employ other mechanisms for tracking the probe messages 166 at the receiving end to distinguish them from other legitimate message traffic and from actual attacks.

As the scanning operation performed by the scanner 110 involves traversing a number of potential sites 150, a check is performed at step 204 to determine if there are more sites to traverse. If so, control reverts to step 201 for the successively found sites. Upon receipt of the probe 166, the scanning device 110 analyzes the received probe message 166 to identify characteristics indicative of messages sent from the identified site 150-1, in which the characteristics are operable to identify successive undesirable messages sent from the identified anonymizing site 150-1, as depicted at step 205. The scanning device 110 employs the gathered characteristics for discriminating successively received messages (i.e. routine non-probe message traffic) to determine messages sent from any of the identified anonymizing sites 150, as shown at step 206. In this manner, the characteristics or behavior exhibited by the actual DDoS attacks are anticipated through the use of the probe transmissions 166 from potential launch pad sites 150-1. The protected device 140 or entity is therefore shielded from undesirable DDoS message traffic by identifying incoming message traffic which matches the anticipated characteristics gathered from the probes 166, discussed in further detail below.

Figure 3:
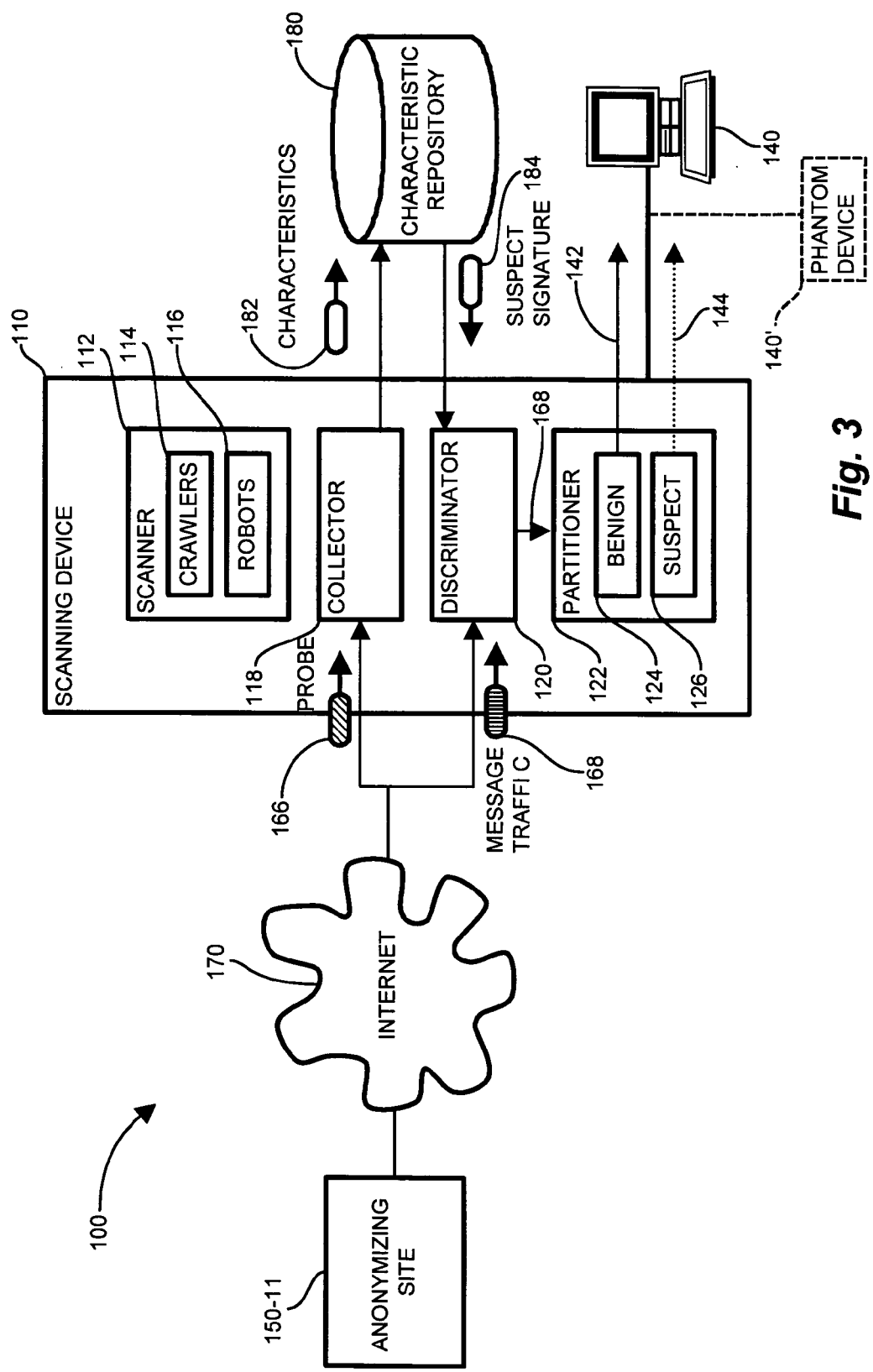
FIG. 3 is a block diagram of the scanner device of FIG. 1 in greater detail.
Figure 4:
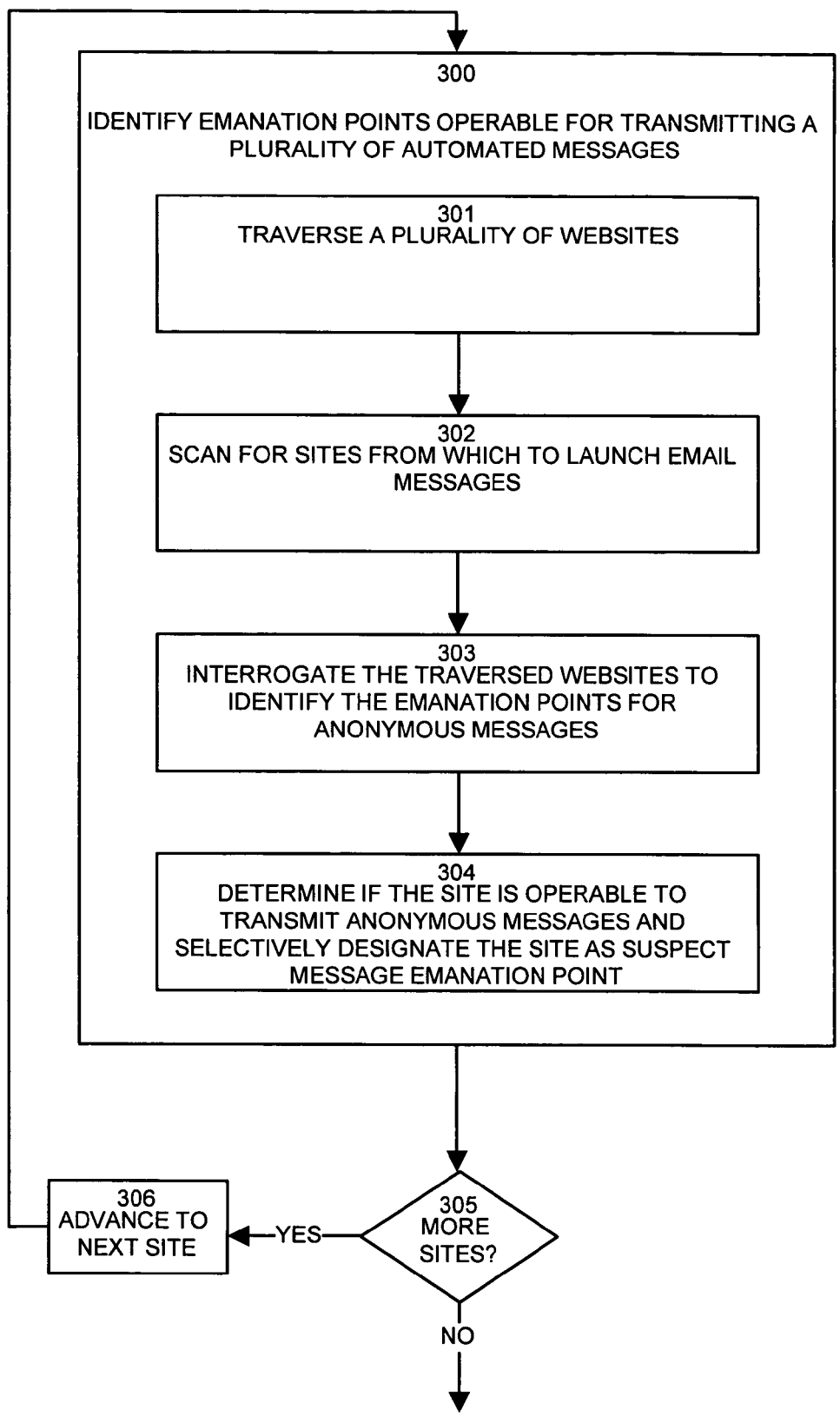
FIGS. 4-7 are a flowchart of the operation of the scanner device of FIG. 3.
Figure 5:
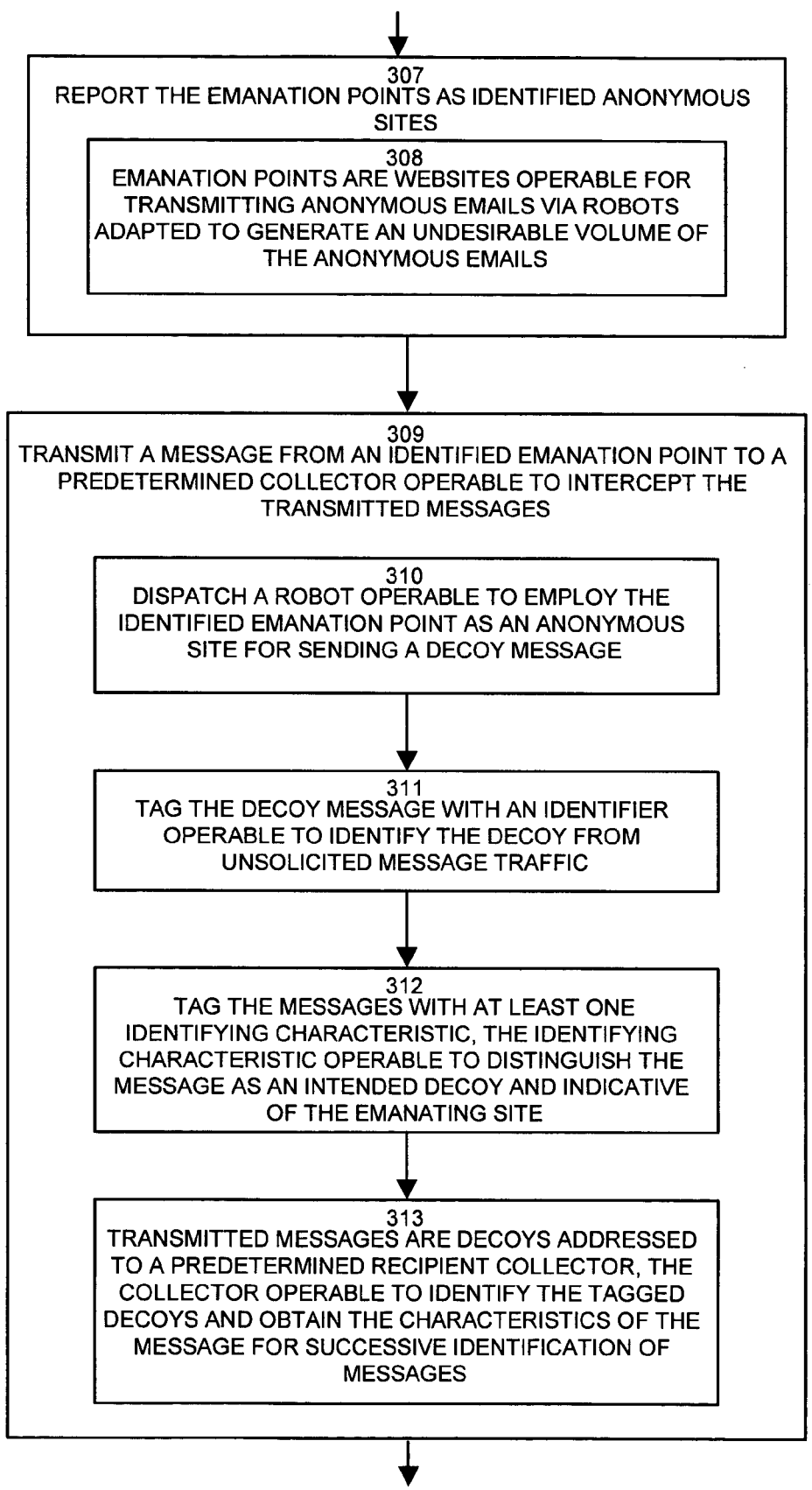
Figure 6:
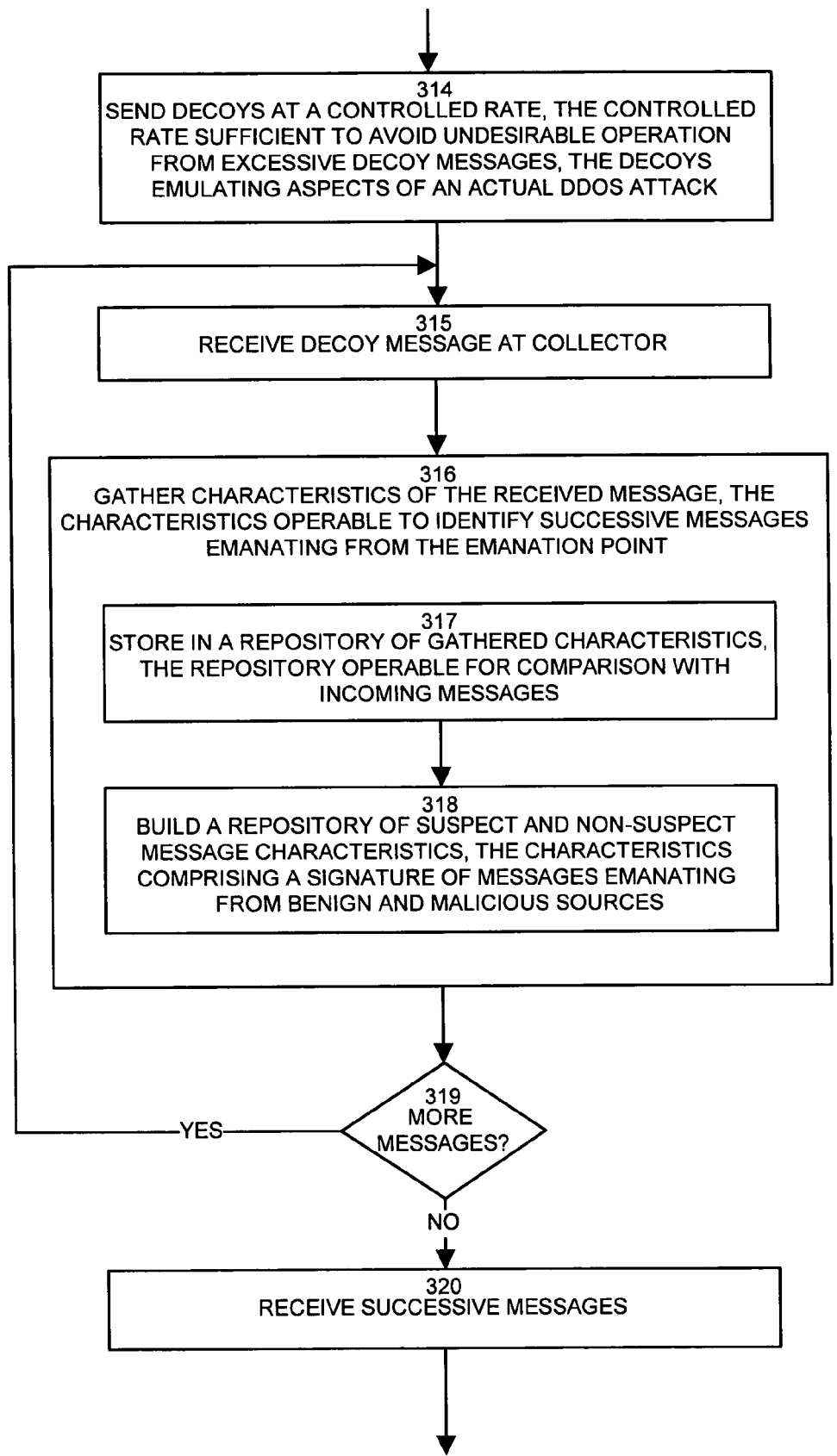
Figure 7:
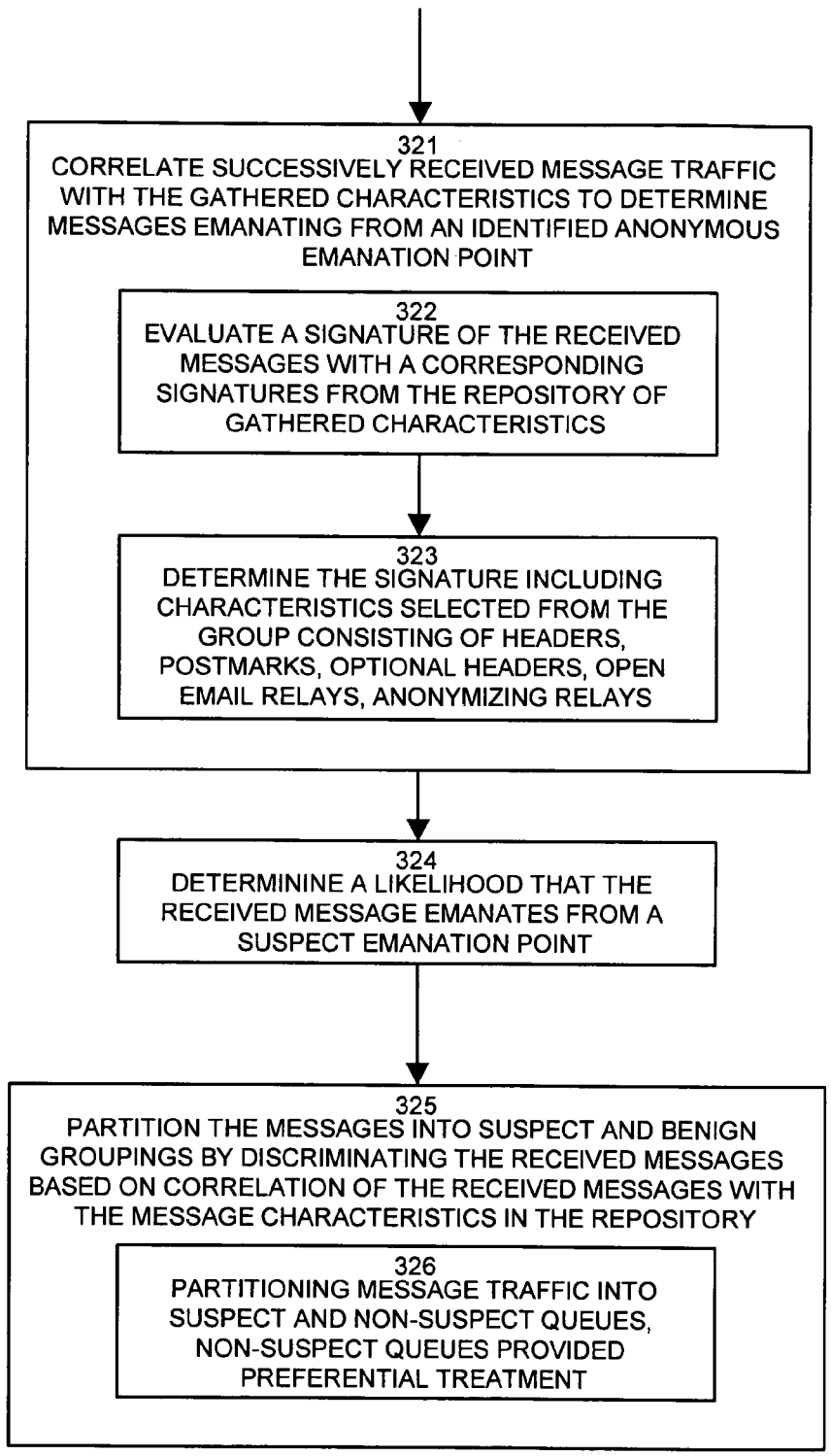

FIG. 3 is a block diagram of the scanning device of FIG. 1 in greater detail. Referring to FIGS. 1 and 3, the scanner device 110 is connected between the Internet 170 or other network and the protected device 140 or network. The scanning device 110 includes a scanner 112, a collector 118, a discriminator 120, and a partitioner 122. The scanner 112 is operable to deploy crawlers 114 and robots 116 for traversing the network 170 and generating probes 166, respectively. The collector 118 receives the probes 166 transmitted from an anonymizing site 150-11, or "launch pad," by the robots 116. The characteristics 182 collected from the probes 166 are stored in a characteristic repository 180 connected to the scanning device 110. Further, in alternate configurations, the characteristics 182 may be combined into the previously-stored information in the repository. For example, the characteristic itself might not be stored but various attributes might be analyzed so as to increment counters in a statistical model kept in the repository. Other arrangements may be that characteristics are collected in a repository, and a separate offline process periodically transforms collected characteristics into usable signatures for discrimination. The discriminator 120 uses the characteristic repository 180 for retrieving suspect signatures 184 indicative of messages sent from the anonymizing sites 150-11. In other words, the collector 118 first distinguishes between probe 166 and other message traffic 168, to identify the probe messages 166 for identifying the suspect characteristics 182. The discriminator 120 employs such information learned from the suspect characteristics 182 in the form of the suspect signatures 184, which the discriminator 120 applies to inform the partitioner how to partition the subsequent traffic 168.

The discriminator 120 analyzes non-collector traffic 168 (i.e. messages other than the designated or tagged probes) against the suspect signatures 184 representing the gathered characteristics 182 of messages emanating from the anonymizing sites 150-11. Therefore, a match or correlation between the subsequent traffic 168 and one or more of the suspect signatures 184 is deemed to be indicative of a DDoS attack. The partitioner 122 is responsive to the discriminator 120 for queuing or storing the discriminated traffic in benign 124 and suspect 126 partitions, or queues. To mitigate the effects of a DDoS attack, suspect message traffic is stored in the suspect 126 partition, or queue, which is serviced at a rate such that an actual DDoS pattern of delivery would not overwhelm the protected system 140. Benign 124, (i.e. non-suspect) message traffic is serviced and delivered at a normal rate.

FIGS. 4-7 are a flowchart of the operation of the scanning device 110 of FIGS. 1 and 3 in greater detail. Crawlers 114 dispatched by the scanner 112 identify emanation points such as anonymizing site 150-11 operable for transmitting a plurality of automated messages (DDoS attack), as depicted at step 300. In the exemplary configuration, the scanner 112 dispatches crawlers 114 operable to traverse a plurality of web sites 150, as shown at step 301. As indicated above, "traversing" is performed by sending request and receiving response messages to various sites and following hyperlinks in documents in pages at one site to other sites. Such crawling, or traversing, is discussed in further detail in Brin, above. The crawlers 114 scan for sites from which to launch email messages, as depicted at step 302, by visiting a plurality of sites 150 and examining or testing each visited site 150 for potential to send anonymous email messages. The crawlers 114, therefore, interrogate each of the traversed web sites 150 to identify the emanation points for anonymous messages, as shown at step 303. The crawlers 114 determine if the site is operable to transmit anonymous messages by analyzing available forms and entry fields for free form entry fields accepting outgoing email text and attributes, for example, as disclosed at step 304. Such sites typically include certain fields, such as sender reply information (i.e. where to send responses to the email) or other entry fields pertaining to outgoing emails. If such fields are found, the crawler 114 designates the site as a suspect message emanation point.

The suspect message emanation points 150-11, therefore, are those from which an anonymous email can be sent (e.g. anonymizing sites). Such a web site, therefore, potentially serves as an effective launch pad for a DDoS attack. Such launch pad sites may be visited repetitively in an automated manner, such as by robots, and a repetitious stream of automatically generated emails sent to the DDoS target, thereby having a detrimental effect on the DDoS target by forcing attention and processing of the influx of a flood of emails.

The crawlers 114 attempt to find a variety of such anonymizing sites 150-11 from among the remote entities 150 visited. Accordingly, a check is performed, at step 305, to determine if there are more sites 150 to traverse. If so, the crawler 114 advances to the next site, as depicted at step 306.

The crawlers 114 report the found emanation points as identified anonymizing sites 150-11, as depicted at step 307. Such emanation points, therefore, are web sites operable for transmitting anonymous emails via robots adapted to generate an undesirable volume of the anonymous emails, or "launch pads," as disclosed at step 308. Responsive to the identified emanation points, the scanner deploys robots 116 for transmitting a message from the identified emanation points to the predetermined collector 118 operable to intercept the transmitted messages, or probes 166, as shown at step 309. Alternatively, the crawlers 114 and the robots 116 may be the same executable entity (e.g. process at the scanning device 110), which define a common web crawling entity by enabling the crawler 114 with the ability to manipulate the found data entry screens for sending the probe messages 166.

Accordingly, the scanner 112 dispatches robots 116 operable to employ the identified emanation point as an anonymizing site 150-11 for sending the probe message 166, as shown at step 310. The robots 116 tag the probe message 166, or probe, with an identifier operable to identify the probe 166 from unsolicited message traffic, as depicted at step 311. The identifier comprises at least one identifying characteristic which is operable to distinguish the message as an intended probe 166 which is indicative of the emanating site, as shown at step 312. A plurality of identifiers may be used, such as designating a particular email address of the collector 118, in which case the transmitted messages are probes 166 addressed to a predetermined recipient collector 118, the collector being operable to identify the tagged probes 166 and obtain the characteristics of the message for successive identification of messages 168 from the anonymizing site 150-11, as shown at step 313.

The robots 116 send, or throttle, the probes 166 at a controlled rate sufficient to avoid undesirable operation from excessive probe messages, as shown at step 314, such that the probes 166 emulate aspects of an actual DDoS attack without the flood of messages which cause detrimental effects. Otherwise, rapid site coverage by the crawlers 114 and robots 116 could itself cause an undesirable backlog at the collector 118 and tend to block legitimate traffic, much as an actual DDoS attack.

The network 170 delivers the probes 166, as depicted at step 315, and the collector 118 at the scanning device 110 gathering characteristics of the received probe messages 166, in which the characteristics are operable to identify successive messages emanating from the emanation point 150-11, as disclosed at step 316. Typically, the anonymizing sites 150-11 are such that the source fields of the messages do not reveal the true source of the messages (e.g. the DDoS attacker's robots), which is the reason such sites are viable launch pads for an anonymous DDoS attack. However, other characteristics 182, such as attributes of the probe messages 166, information about the network path traveled, and the recipient info, to name several, provide such identifying characteristics 182.

The collector 118 stores the gathered characteristics 182 in the characteristic repository 180 to build a repository of gathered characteristics 180 which is operable for comparison with incoming messages 168, as shown at step 317. Further, the characteristic repository 180 is operable for building a signature set of suspect and/or benign message characteristics 184 to designate the characteristics comprising a signature of messages emanating from benign 124 and malicious 126 sources, as depicted at step 318. Such partitioning of message characteristics enable correlation with successively received messages 168 to identify message traffic as benign or suspect.

A check is performed to determine if there are more probe messages 166 receivable to build the characteristic repository 180, as disclosed at step 319, and control reverts to step 315 accordingly. It should be noted that building the repository 180 likely occurs in an ongoing manner with receiving subsequent message traffic 168 and is shown in a serial form here for simplicity and clarity.

Upon receiving subsequent message traffic 168, as depicted at step 320, the discriminator 120 correlates the successively received message traffic 168 with the gathered characteristics 182 to determine messages emanating from an identified anonymous emanation point, or anonymizing site 150-11, as shown at step 321. Correlation of the subsequent traffic 168 with the characteristic repository 180 takes the form of a variety of comparison and matching operations. Single valued matches from a single characteristic, such as a particular address in the message header may be performed, as well as more complex computations such as comparisons with multiple characteristics indicative of attributes may be performed. The discriminator 120 identifies a group of characteristics from each particular anonymizing site 150-11 which operate as a signature indicative of messages sent from that particular site 150-11. The discriminator 120 evaluates a signature of the received messages 168 with corresponding signatures 184 from the repository of gathered characteristics 180, as depicted at step 322. For example, determining the signature 184 may include characteristics from attributes such as headers, postmarks, optional headers, open email relays and anonymizing relays, as disclosed at step 323.

Based on the correlation, the discriminator 120 determines a likelihood that the received message 168 emanates from a suspect emanation point, as depicted at step 324. Therefore, the correlation need not result in an absolute positive or negative conclusion of a particular message emanating from an anonymizing site 150-11, but rather may indicate a likelihood of being a suspect or benign message. Responsively to the discriminator 120, the partitioner 122 then partitions the messages 168 into suspect 126 and benign 124 groupings by separating or classifying the received messages 168 based on correlation of the received messages 168 with the message characteristics 182 in the repository 180, as shown at step 325.

Based on the correlation of the discriminator 120, the partitioner 122 partitions the subsequent message traffic 168 into suspect 126 and benign 124 queues, or groups, in which the benign queues 124 are provided preferential treatment, as depicted at step 326 and shown by solid arrow 142. Since the benign 124 and suspect 126 categories do not represent absolute blockages of incoming messages, but rather merely less than preferential treatment for suspect messages, as shown by dotted arrow 144, malign messages potentially representing a DDoS attack are treated such that a small number of false positives will merely cause a small delay in delivery. A larger number, representing an actual DDoS attack or, at a minimum, undesirable message traffic, will be queued at such a rate that many will be bounced back to the sender and those that are delivered will be delivered at a benign rate which does not compromise system resources. Alternatively, particular configurations may simply deny successive suspect messages from receipt. Further, the partitioner 122 may optionally generate notifications to senders or sites 150 alerting them that their messages 168 are being categorized as low-priority, and explaining that use of other message mechanisms without this DDoS threat potential would avoid potential delay for their messages.

It should be noted that the above described principles of the invention, although described in terms of an exemplary DDoS defense, is also readily applicable to telephony, SMS, or instant messaging if there were sufficient interoperability and enough sites available. For example, it is possible to send a message to a vendor A phone via an anonymous form on the vendor A site and also via a second Vendor B service. The DDoS problem is still manageable because there is only a single anonymous site and the Vendor B site is, for example, tightly-controlled. But with increased gatewaying of messages between media, "untraceable clusterbomb" DDoS attacks will be possible with both non-email targets and non-email emanating sites. Alternate configurations of the claimed system are operable to defend against attacks in those media as well, particularly attacks that (for example) cross media such as using email gateways to attack a person's voicemail.

In alternate configurations, more complex analysis takes advantage of the other email headers. One particular approach processes a database of known "legitimate" email headers to build a dictionary such as would be used in a compression algorithm, along with frequency information. The database of "legitimate" email headers can steadily grow in size, or can have a fixed size with new email headers displacing the oldest email headers. We can similarly build a dictionary for a database of email headers received on the known-suspect incoming address, to which we can add any items known to be "bad" that are received on the regular incoming address.

Then we can combine the resulting dictionaries so as to produce a dictionary that consists of terms that are common in bad messages and uncommon or nonexistent in good messages. We use the resulting dictionary to score incoming emails—messages exceeding a configurable threshold of "bad" elements are considered suspect. Alternate schemes involving partial-string matching, hidden Markov models, or other implementations such as deploy against spammers may also be used. The above described mechanisms employ the notion of using the attacker's mechanism at a slower rate to prime a defense. Even if certain configurations had to depend on a large manual collation of the sender addresses, it should be able to build a large database of suspect senders that should be substantially stable.

Those skilled in the art should readily appreciate that the programs and methods for detecting undesirable message traffic such as denial of service attacks as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for detecting undesirable message traffic has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method, comprising:

identifying an emanation point operable to transmit a plurality of automated messages;

transmitting the plurality of automated messages from the identified emanation point to a predetermined collector operable to intercept the automated messages, where the automated messages are tagged probes, where the predetermined collector is to identify tagged probes and obtain characteristics of the automated messages for successive identification of later received messages, and where the tagged probes are sent at a controlled rate sufficient to avoid undesirable operation from excessive tagged probes, the tagged probes emulating aspects of an actual DDoS attack;

gathering characteristics of later received messages, where the characteristics identify successive messages emanating from the emanation point;

building a repository of gathered characteristics to compare to incoming messages to be analyzed;

correlating successive messages with the gathered characteristics to identify suspect messages emanating from an identified anonymous emanation point evaluating a signature of the suspect messages identified as emanating from the identified anonymous emanation point with a corresponding signature from the repository of gathered characteristics;

determining a likelihood that the suspect messages identified as emanating from the identified anonymous emanation point emanate from a suspect emanation point; and providing a signal that identifies undesirable message traffic based on the likelihood.

2. The method of claim 1, where emanation points are web sites that transmit anonymous emails via robots that generate an undesirable volume of the anonymous emails.

3. The method of claim 2, where identifying emanation points-comprises:

dispatching crawlers to traverse a plurality of web sites;

interrogating the traversed web sites to identify the emanation points for anonymous messages; and reporting the emanation points as identified anonymous sites.

4. The method of claim 1, where transmitting the plurality of automated messages comprises:

dispatching a robot to employ the identified emanation point as an anonymous site for sending a probe message; and tagging the probe message with an identifier that distinguishes the probe message from unsolicited message traffic.

5. The method of claim 1, where identifying emanation points comprises:

scanning for sites from which to launch email messages;

determining if the site is operable to transmit anonymous messages; and if so, designating the site as a suspect message emanation point.

6. The method of claim 5, where identifying emanation points comprises tagging the anonymous messages with at least one identifying characteristic that distinguishes the message as an intended probe and that is indicative of the emanating site.

7. The method of claim 1, comprising:

building a repository of suspect messages characteristics and benign message characteristics, the characteristics comprising a signature of messages emanating from benign and malicious sources respectively;

receiving successive messages; and partitioning the received successive messages into suspect and benign groupings by discriminating the received successive messages based on correlation of the received successive messages with the characteristics in the repository.

8. The method of claim 7, where determining the signature includes examining characteristics selected from the group consisting of headers, postmarks, optional headers, use of open email relays, and use of known anonymizing relays.

9. The method of claim 8, the method comprising:

partitioning message traffic into suspect and benign queues, and providing preferential treatment to benign queues.

10. A device, comprising:

a scanner to identify emanation points for transmitting a plurality of automated messages and to deploy robots for transmitting the plurality of messages from an identified emanation point to a predetermined protected destination operable to intercept the plurality of automated messages;

where an automated message is a tagged probe addressed to the predetermined protected destination that is operable to identify the tagged probe and to obtain characteristics of the automated message for successive identification of messages;

where tagged probes are sent at a controlled rate that is sufficient to avoid undesirable operation from excessive tagged probes, and where a tagged probe emulates aspects of an actual DDoS attack;

a collector to gather characteristics of received messages that are indicative of messages from the identified emanation point, and to build a repository of gathered characteristics that facilitate performing comparisons with incoming messages a discriminator for correlating successively received messages with the gathered characteristics to determine suspect messages emanating from an identified anonymous emanation point, to identify successive messages emanating from the identified anonymous emanation point, to evaluate a signature of the successive messages with corresponding signatures from the repository of gathered characteristics; and to determine a likelihood that the successive messages emanate from a suspect emanation point; and to provide a signal identifying undesirable message traffic based on the likelihood.

11. The device of claim 10, where emanation points identified by the scanner are anonymizing web sites for transmitting anonymous emails via robots adapted to generate an undesirable volume of the anonymous emails.

12. The device of claim 11, where the scanner dispatches crawlers:

traverse a plurality of web sites;

interrogate the traversed web sites to identify the emanation points for anonymous messages; and report the emanation points as identified anonymous sites.

13. The device of claim 10, where the scanner is to dispatch at least one robot operable to employ the identified emanation point as an anonymous site for sending a probe message, the at least one robot being operable to tag the probe message with an identifier operable to identify the probe from unsolicited message traffic.

14. The device of claim 10, where the scanner is to enable crawlers configured to:

scan for sites from which to launch email messages;

determine if the site is operable to transmit anonymous messages;

selectively designate the site as suspect message emanation point based on the determining; and deny successive suspect messages from receipt.

15. The device of claim 14, where the robots are operable to tag the messages with at least one identifying characteristic that distinguishes the message as an intended probe and that is indicative of the emanating site.

16. The device of claim 15, where the collector is operable to build a repository of suspect and benign message characteristics, the characteristics comprising a signature of messages emanating from benign and malicious sources and further operable to receive successive messages, further comprising a partitioner operable to partitioning the messages into suspect and benign groupings by discriminating the received messages based on correlation of the received messages with the message characteristics in the repository.

* * * * *